(12) United States Patent
Revier et al.

(10) Patent No.: US 12,042,829 B2
(45) Date of Patent: Jul. 23, 2024

(54) METHODS AND APPARATUS FOR SURFACE WETTING CONTROL

(71) Applicant: TEXAS INSTRUMENTS INCORPORATED, Dallas, TX (US)

(72) Inventors: Daniel Lee Revier, Addison, TX (US); Benjamin Stassen Cook, Addison, TX (US); David Patrick Magee, Allen, TX (US); Stephen John Fedigan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 916 days.

(21) Appl. No.: 17/020,625

(22) Filed: Sep. 14, 2020

(65) Prior Publication Data
US 2020/0406316 A1 Dec. 31, 2020

Related U.S. Application Data

(62) Division of application No. 15/492,433, filed on Apr. 20, 2017, now Pat. No. 10,780,467.

(51) Int. Cl.
*B08B 7/02* (2006.01)
*F26B 5/02* (2006.01)
*G02B 27/00* (2006.01)

(52) U.S. Cl.
CPC .............. *B08B 7/028* (2013.01); *G02B 27/00* (2013.01); *G02B 27/0006* (2013.01); *F26B 5/02* (2013.01)

(58) Field of Classification Search
CPC ....... G02B 27/00; G02B 27/0006; F26B 5/02; B08B 3/10; B08B 7/028
See application file for complete search history.

(56) References Cited

U.S. PATENT DOCUMENTS

| | | | |
|---|---|---|---|
| 3,681,626 | A | 8/1972 | Puskas |
| 4,019,073 | A | 4/1977 | Vishnevsky et al. |
| 4,271,371 | A | 6/1981 | Furuichi et al. |
| 4,556,467 | A | 12/1985 | Kuhn et al. |
| 4,607,652 | A | 8/1986 | Yung |
| 4,654,554 | A | 3/1987 | Kishi |
| 4,691,725 | A | 9/1987 | Parisi |

(Continued)

FOREIGN PATENT DOCUMENTS

| | | |
|---|---|---|
| CN | 1821536 A | 8/2006 |
| CN | 1821539 A | 8/2006 |

(Continued)

OTHER PUBLICATIONS

DE10114230A1 Machine Translation (Year: 2001).

(Continued)

*Primary Examiner* — Jessica Yuen
(74) *Attorney, Agent, or Firm* — John R. Pessetto; Frank D. Cimino

(57) ABSTRACT

For surface wetting control, an apparatus can expel fluid from a droplet on a surface using a transducer mechanically coupled to the surface. A first area of the surface can have a first wettability for the fluid, and a second area of the surface can have a second wettability for the fluid. The first wettability of the first area of the surface can be greater than the second wettability of the second area of the surface. The first area and the second area can have a patterned arrangement.

14 Claims, 12 Drawing Sheets

(56) References Cited

U.S. PATENT DOCUMENTS

| | | | |
|---|---|---|---|
| 4,710,233 | A | 12/1987 | Hohmann et al. |
| 4,836,684 | A | 6/1989 | Javorik et al. |
| 4,852,592 | A | 8/1989 | DiGangi et al. |
| 4,870,982 | A | 10/1989 | Liu |
| 5,005,015 | A | 4/1991 | Dehn et al. |
| 5,005,016 | A | 4/1991 | Schmidt |
| 5,037,189 | A | 8/1991 | Fujie et al. |
| 5,071,776 | A | 12/1991 | Matsushita et al. |
| 5,113,116 | A | 5/1992 | Wilson |
| 5,136,425 | A | 8/1992 | Fujie et al. |
| 5,155,625 | A | 10/1992 | Komatsu et al. |
| 5,178,173 | A | 1/1993 | Erickson et al. |
| 5,313,333 | A | 5/1994 | O'Brien et al. |
| 5,706,840 | A | 1/1998 | Schneider et al. |
| 5,853,500 | A | 12/1998 | Joshi et al. |
| 6,064,259 | A | 5/2000 | Takita |
| 6,607,606 | B2 | 8/2003 | Bronson |
| 6,764,168 | B1 | 7/2004 | Meinhold et al. |
| 6,880,402 | B1 | 4/2005 | Couet et al. |
| 7,215,372 | B2 | 5/2007 | Ito et al. |
| 7,705,517 | B1 | 4/2010 | Koen et al. |
| 7,705,519 | B2 | 4/2010 | Yamashita |
| 8,286,801 | B2 | 10/2012 | Youngs et al. |
| 8,293,026 | B1 | 10/2012 | Bodor et al. |
| 8,337,760 | B2 | 12/2012 | Wolters |
| 8,494,200 | B2 | 7/2013 | Ram et al. |
| 8,899,761 | B2 | 12/2014 | Tonar et al. |
| 9,070,856 | B1 | 6/2015 | Rose et al. |
| 9,080,961 | B2 | 7/2015 | Adachi |
| 9,084,053 | B2 | 7/2015 | Parkins |
| 9,095,882 | B2 | 8/2015 | Shimada et al. |
| 9,226,076 | B2 | 12/2015 | Lippert et al. |
| 9,253,297 | B2 | 2/2016 | Abe et al. |
| 9,573,165 | B2 | 2/2017 | Weber et al. |
| 9,796,359 | B2 | 10/2017 | Field et al. |
| 10,384,239 | B2 | 8/2019 | Fedigan et al. |
| 10,596,604 | B2 | 3/2020 | Fedigan et al. |
| 10,780,467 | B2 | 9/2020 | Revier et al. |
| 2002/0139394 | A1 | 10/2002 | Bronson |
| 2003/0214599 | A1 | 11/2003 | Ito et al. |
| 2006/0203342 | A1* | 9/2006 | Chen ........................ G02B 1/18 359/507 |
| 2006/0285108 | A1 | 12/2006 | Morrisroe |
| 2007/0046143 | A1 | 3/2007 | Blandino et al. |
| 2007/0103554 | A1 | 5/2007 | Kaihara et al. |
| 2007/0159422 | A1 | 7/2007 | Blandino et al. |
| 2008/0198458 | A1 | 8/2008 | Kashiyama |
| 2008/0248416 | A1 | 10/2008 | Norikane et al. |
| 2009/0026883 | A1 | 1/2009 | Croft et al. |
| 2010/0165170 | A1 | 7/2010 | Kawai et al. |
| 2010/0171872 | A1 | 7/2010 | Okano |
| 2011/0073142 | A1 | 3/2011 | Hattori et al. |
| 2011/0228389 | A1 | 9/2011 | Ohashi |
| 2012/0224309 | A1 | 9/2012 | Ikeda et al. |
| 2013/0170685 | A1 | 7/2013 | Oh et al. |
| 2013/0242481 | A1 | 9/2013 | Kim et al. |
| 2013/0333978 | A1 | 12/2013 | Abe et al. |
| 2014/0033454 | A1 | 2/2014 | Koops et al. |
| 2014/0218877 | A1 | 8/2014 | Wei et al. |
| 2014/0253150 | A1 | 9/2014 | Menzel et al. |
| 2015/0277100 | A1 | 10/2015 | Novoselov |
| 2016/0178898 | A1 | 6/2016 | Eineren et al. |
| 2016/0266379 | A1 | 9/2016 | Li |
| 2017/0343458 | A1 | 11/2017 | Kravitz et al. |
| 2017/0361360 | A1 | 12/2017 | Li et al. |
| 2017/0371154 | A1 | 12/2017 | Fedigan |
| 2018/0117642 | A1 | 5/2018 | Magee et al. |
| 2018/0239218 | A1 | 8/2018 | Ikeuchi et al. |
| 2018/0264526 | A1 | 9/2018 | Kim et al. |
| 2018/0275397 | A1 | 9/2018 | Chung et al. |
| 2018/0304282 | A1 | 10/2018 | Cook et al. |
| 2018/0326462 | A1 | 11/2018 | Revier et al. |
| 2019/0277787 | A1 | 9/2019 | Chung et al. |

FOREIGN PATENT DOCUMENTS

| | | |
|---|---|---|
| CN | 101063830 A | 10/2007 |
| CN | 101274326 A | 10/2008 |
| CN | 201223863 Y | 4/2009 |
| CN | 201579230 U | 9/2010 |
| CN | 103191886 A | 7/2013 |
| CN | 103312948 A | 9/2013 |
| CN | 103376612 A | 10/2013 |
| CN | 103775869 A | 5/2014 |
| DE | 10114230 A1 | 10/2001 |
| DE | 102012214650 | 2/2014 |
| EP | 1703062 A2 | 9/2006 |
| EP | 2873572 A1 | 5/2015 |
| EP | 2777579 B1 | 11/2015 |
| JP | 2009283069 A | 12/2009 |
| JP | 5608688 B2 | 10/2014 |
| KR | 20130076250 A | 7/2013 |
| WO | 2007005852 A2 | 1/2007 |
| WO | 2010104867 A1 | 9/2010 |
| WO | 2479595 A1 | 7/2012 |
| WO | 201820701 W | 2/2018 |
| WO | 2016167110 A1 | 2/2018 |
| WO | 2018207041 A1 | 11/2018 |

OTHER PUBLICATIONS

Office Action for Chinese Patent Application No. ;201780067964.X dated Apr. 23, 2021, 2 pages.
Office Action for Chinese Patent Application No. 201780069987.4 dated Apr. 23, 2021, 2 pages.
DE102012214650, English Machine Translation, 14 pages.
CN101274326A, English Machine Translation, 11 pages.
CN103376612A, English Machine Translation, 16 pages.
CN103312948AA, English Machine Translation, 15 pages.
CN201223863Y, English Machine Translation, 16 pages.
CN101063830A, English Machine Translation, 29 pages.
CN201579230U, English Machine Translation, 11 pages.
Howard "High Speed Photography of Ultrasonic Atomization," Thesis, Brown University, May 13, 2010 (39 pages).
Graff, "Wave Motion in Elastic Solids", Dover, 1991, 3 pages.
Hagedorn, et al., "Travelling Wave Ultrasonic Motors, Part I: Working Principle and Mathematical Modelling of the Stator", Journal of Sound and Vibration, 1992, 155(1), pp. 31-46.
Ziaei-Moayyed, et al. "Electrical Deflection of Polar Liquid Streams: A Misunderstood Demonstration," Journal of Chemical Education, vol. 77, No. 11, Nov. 2000 (4 pages).
International Search Report for PCT/US2017/059536 dated Feb. 28, 2018, 3 pages.
Vaseiljev, "Ultrasonic system for solar panel cleaning," Sensors and Actuators A: Physical 200 (2013) pp. 74-78.
Kazemi, "Substrate Cleaning using Ultrasonics/Megasonics," IEEE, 2000, 6 pages.
Brereton, "Particle Removal by Focused Ultrasound," Journal of Sound and Vibration, 1994, pp. 683-698.
Gale, "Removal of Particulate Contaminants using Ultrasonics and Megasonics: A Review," Particulate Science and Technology, 2007, 16 pages.
Lee, "Smart Self-Cleaning Cover Glass for Automotive Miniature Cameras," IEEE, 2016, 4 pages.
International Search Report for PCT/US2017/064530 dated Apr. 5, 2018, 3 pages.
International Search Report in corresponding PCT Application No. PCT/US2018/016714, dated Jun. 21, 2018, 2 pages.
JP5608688B2, English Machine Translation, 15 pages.
Extended European Search Report in corresponding 17866470.2, dated Sep. 25, 2019, 2 pages.
Extended European Search Report in corresponding 17878085.4, dated Nov. 13, 2019, 7 pages.
Partial Supplementary European Search Report for 18747814.4, dated Jan. 13, 2020, 13 pages.
TI-78189CN Chinese Office Action dated Sep. 27, 2021.

* cited by examiner

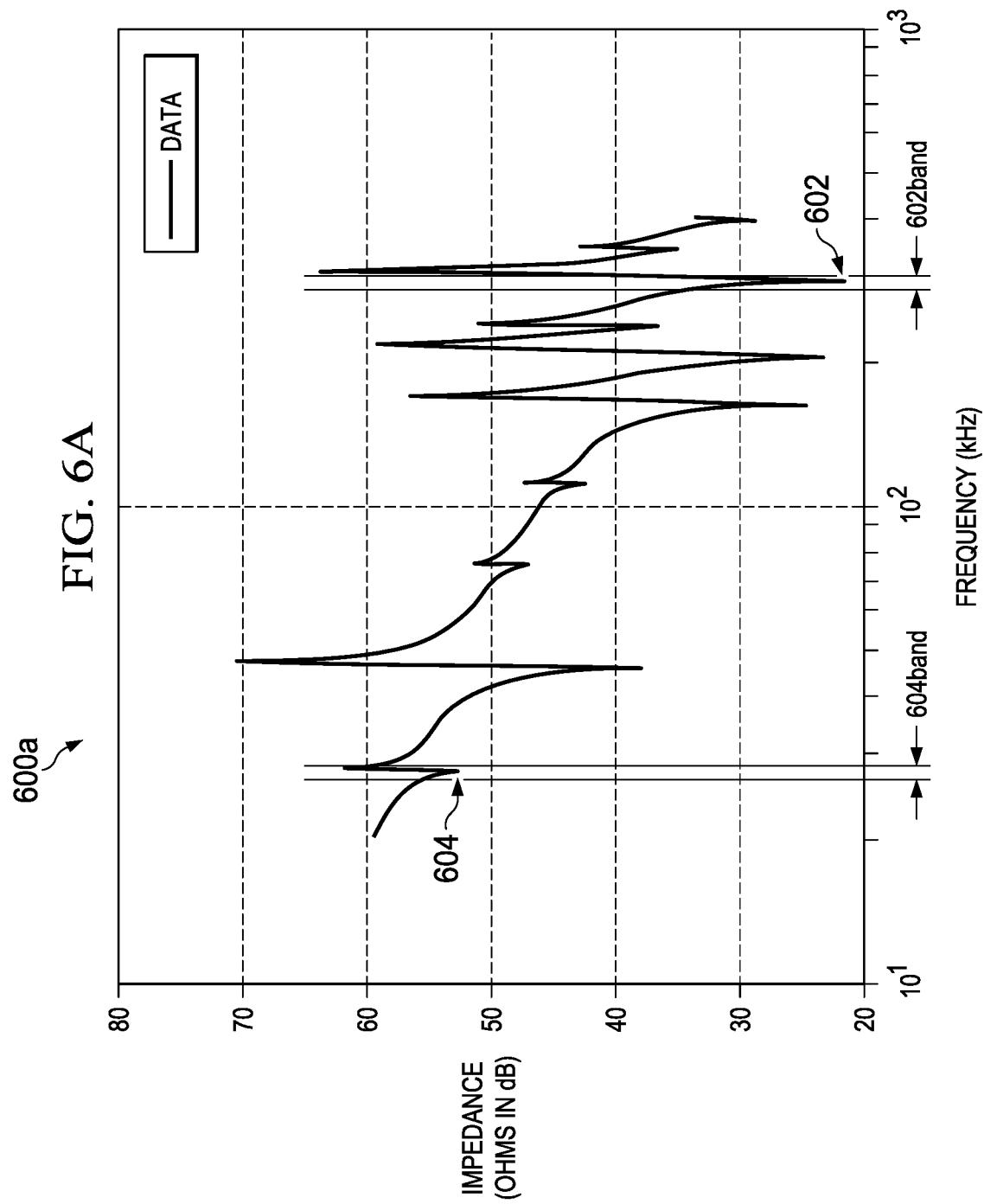

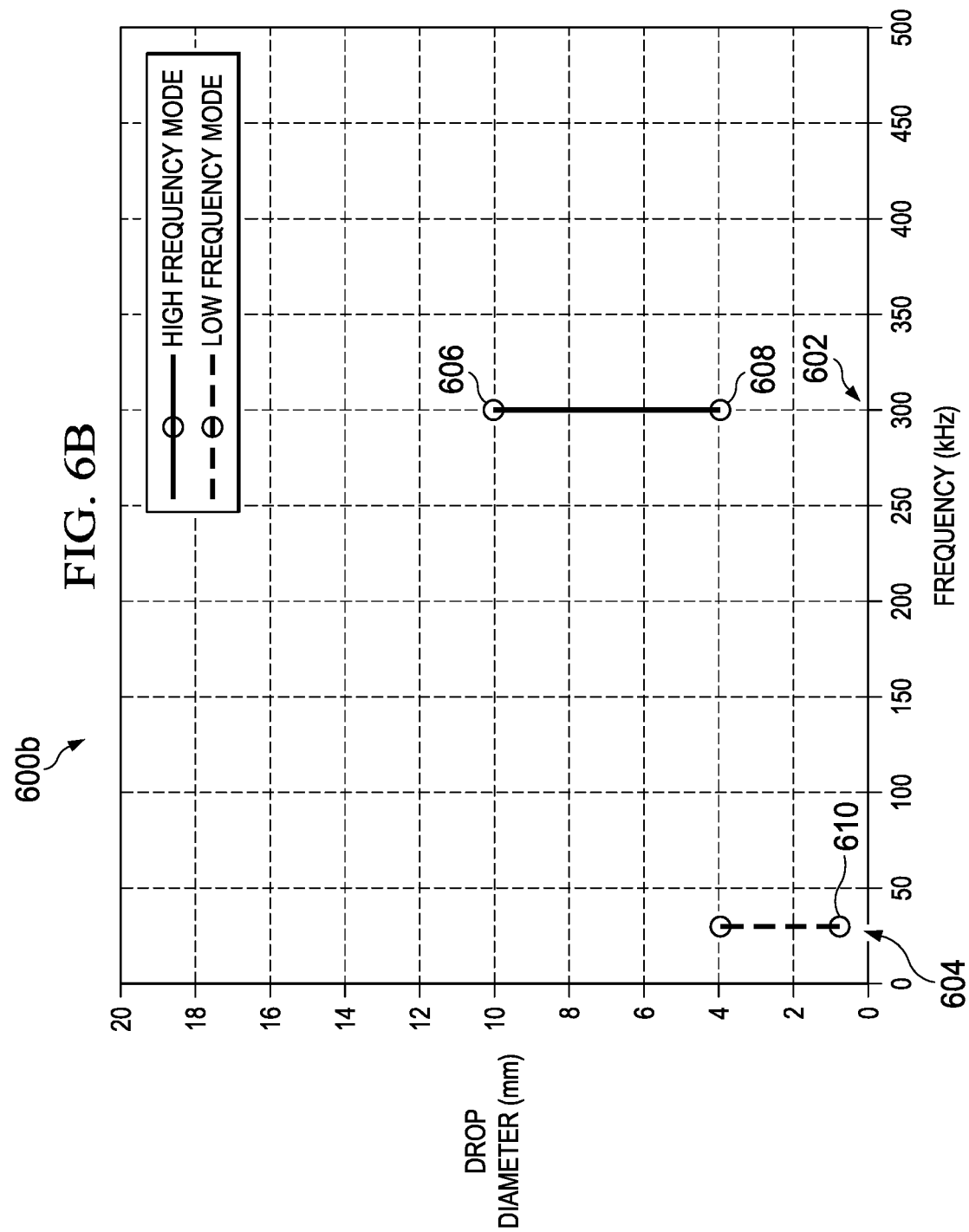

METHODS AND APPARATUS FOR SURFACE WETTING CONTROL

CROSS-REFERENCE TO RELATED APPLICATION

This application is a divisional of U.S. patent application Ser. No. 15/492,433 filed Apr. 20, 2017, which is incorporated herein by reference.

TECHNICAL FIELD

This description relates generally to surface wetting, and more particularly to methods and apparatus for surface wetting control.

BACKGROUND

Unfortunately, a number of motor vehicle deaths appears to be increasing every year. This trend is caused by various reasons, including an increase in the driving population. Also, more engineering effort is needed to reduce risk of death or serious injury in automobiles. In addition to avoiding risks to drivers and passengers, more robust obstacle and collision avoidance systems are required to reduce the high cost of damage to automobiles and other property due to collisions.

Manufacturers can incorporate new technologies into new automobiles at a reasonable cost. Some promising technologies may help to improve obstacle and collision avoidance systems, such as digital camera based surround view and camera monitoring systems. In some cases, cameras can increase safety by mounting in locations that give a driver access to alternative perspectives, which are otherwise diminished or unavailable to the driver's usual view through windows or mirrors. While mounting one or more cameras for alternative views can provide many advantages, some challenges may remain.

SUMMARY

Mounting cameras for alternative views may expose optical surfaces associated with cameras to hazards such as fluid droplets (e.g., water droplets) that can interfere with visibility of such alternative views. The described examples include methods and apparatus for surface wetting control. In certain described examples, an apparatus can expel fluid from a droplet on a surface using a transducer mechanically coupled to the surface. A first area of the surface can have a first wettability for the fluid, and a second area of the surface can have a second wettability for the fluid. The second wettability of the second area of the surface can be greater than the first wettability of the first area of the surface. The first area and the second area have a patterned arrangement.

Other described examples include a method to operate upon a droplet having a first size. For example, the first size of the droplet can be received to overlap a first area of a surface and a second area of the surface. The first area can have the first wettability for fluid of the droplet, and the second area of the surface can have the second wettability for the fluid, in which the second wettability of the second area of the surface is greater than the first wettability of the first area of the surface. A first signal including a first frequency can be generated to be coupled with the transducer mechanically coupled to the surface. The transducer can be activated at the first frequency by coupling the first signal with the transducer. The droplet can be reduced using the first frequency of the first signal from the first size to a second size.

BRIEF DESCRIPTION OF THE DRAWINGS

FIG. 6A is a diagram of impedance versus frequency for an example ultrasonic transducer mechanically coupled to an example optical surface according to an embodiment.

FIG. 6B is a diagram of example droplet size reduction versus frequency according to an embodiment.

DETAILED DESCRIPTION OF EXAMPLE EMBODIMENTS

U.S. Pat. Nos. 10,596,604 and 10,384,239 are incorporated herein by reference.

Figure 1:
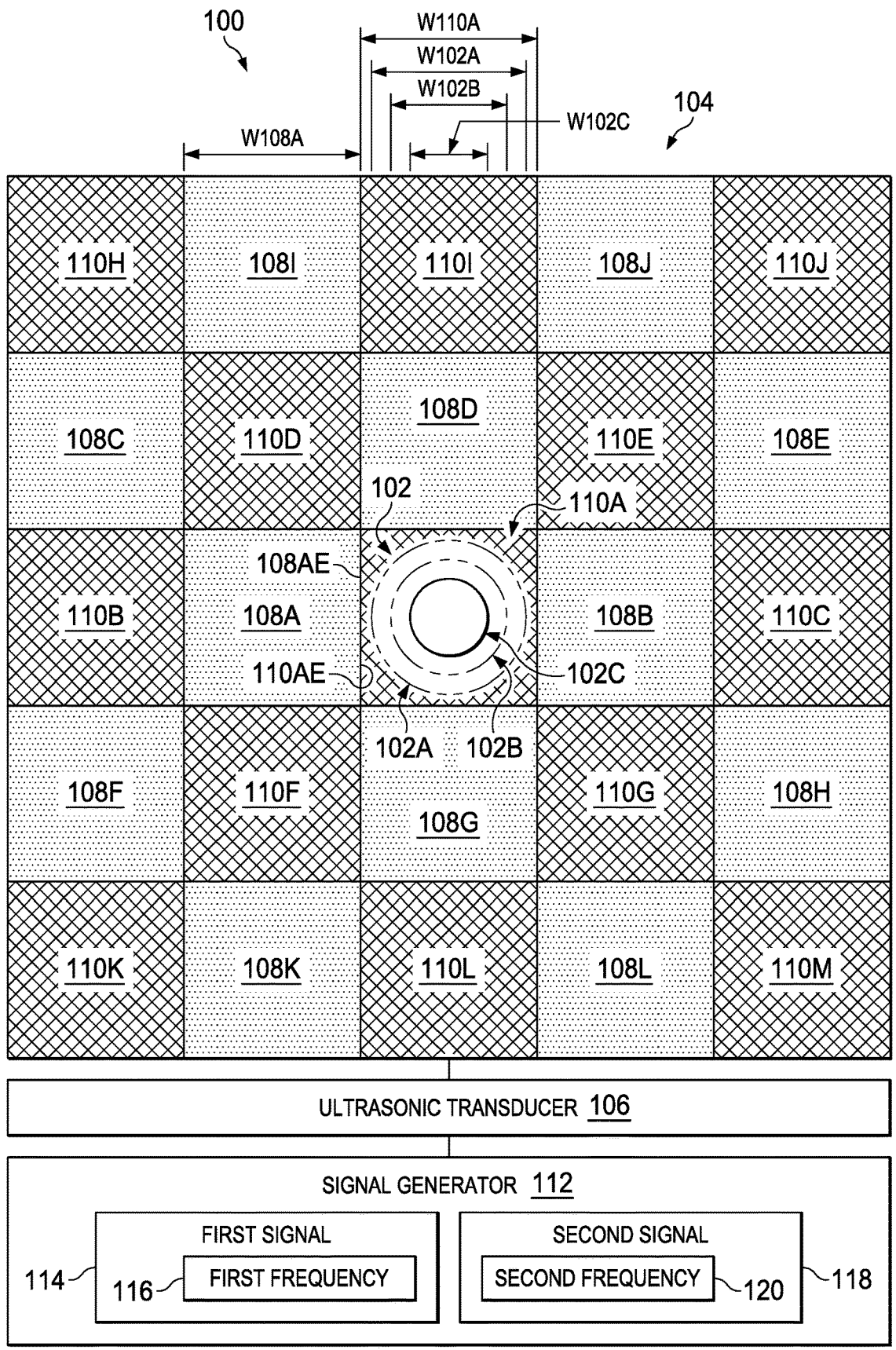
FIG. 1 is partial block diagram of a system according to an embodiment including an apparatus that can expel fluid from a droplet on an optical surface under surface wetting control.

FIG. 1 is partial block diagram of a system 100 that can expel fluid (e.g. water) from a droplet 102 from an optical surface 104 using an ultrasonic transducer 106 mechanically coupled to the optical surface 104. This apparatus can expel fluid from the droplet by atomization under wettability control from the optical surface 104. For example, the ultrasonic transducer 106 can be a piezoelectric ultrasonic transducer 106 including a piezoelectric material (e.g., lead zirconate titanate PZT or niobium doped lead zirconate titanate PNZT.) Epoxy can be used for the mechanical coupling of the ultrasonic transducer 106 with the optical surface 104. The fluid droplet 102 can be disposed on the optical surface 104, and can be coupled with the ultrasonic transducer 106 through the optical surface 104. In the example of FIG. 1, the ultrasonic transducer 106 mechanically coupled to the optical surface 104 has first and second resonant frequency bands.

A first area 108A of the optical surface 104 can have a first wettability for the fluid, and a second area 110A of the optical surface 104 can have a second wettability for the fluid. The first area 108A is shown in the example of FIG. 1 using stippling. The second area 110A is shown in the example of FIG. 1 using cross hatching.

The second wettability of the second area 110A of the optical surface 104 can be greater than the first wettability of the first area 108A of the optical surface 104. For example, a hydrophobic coating can be applied to the first area 108A, so as to limit the wettability of the first area 108A. For example, application of the hydrophobic coating to the second area 110A can be avoided, so that second wettability of the second area 110A of the optical surface 104 can be greater than the first wettability of the first area 108A.

The first area 108A and the second area 110A can have a patterned arrangement, as shown in the example of FIG. 1. Further, the first area 108A can be a plurality of first areas 108A, 108B, 108C, 108D, 108E, 108F, 108G, 108H, 108I, 108J, 108K, 108L. The second area 110A can be a plurality of second areas 110A, 110B, 110C, 110D, 110E, 110F, 110G, 110H, 110I, 110J, 110K, 110L, 110M. A patterned arrangement of the first and second areas can be an alternating arrangement, as shown for example in FIG. 1, in which a member of the first areas (e.g., first area 108A) can be interposed between a pair of members of the second areas (e.g., pair of second areas 110A, 110B). In the alternating arrangement shown for example in FIG. 1, a member of the second areas (e.g., second area 110A) can be interposed between a pair of members of the first areas (e.g., pair of first areas 108A, 108B). The first area (e.g., first area 108A) and the second area (e.g., second area 110A) can be adjacent to one another in the patterned arrangement, as shown in the example of FIG. 1. A first edge 108AE of the first area (e.g., first area 108A) can be proximate to a second edge 110AE of the second area (e.g., second area 110A) in the patterned arrangement.

Accordingly, the patterned arrangement of the first and second areas can be an alternating grid arrangement, for example a checkerboard like square grid arrangement as shown for example in FIG. 1. In other examples the optical surface 104 can be circular. For example, the patterned arrangement of the first and second areas can be an alternating concentric circular grid arrangement. For example, rather than the checkerboard like square grid arrangement shown in the example of FIG. 1, a dart board like concentric circular grid arrangement can be used in the patterned arrangement of the first and second areas.

As shown in the example of FIG. 1, a signal generator 112 can be coupled with the ultrasonic transducer 106. The signal generator 112 can generate a first signal 114 including a first frequency 116 to reduce the fluid droplet from a first size 102A to a second size 102B, and to generate a second signal 118 including a second frequency 120 to reduce the fluid droplet from the second size 102B to a third size 102C. In the drawings: the first droplet size 102A is representatively illustrated using a dash-dot-dot-dash line style; the second droplet size 102B is representatively illustrated using a dash-dot-dash line style; and the third droplet size 102C is representatively illustrated using solid line style.

The first frequency 116 to reduce the fluid droplet from the first size 102A to the second size 102B can be higher in frequency than the second frequency 120 to reduce the fluid droplet from the second size 102B to the third size 102C. The first frequency 116 of the first signal 114 is within the first resonant frequency band of the ultrasonic transducer 106 mechanically coupled to the optical surface 104. In some examples, the first frequency 116 of the first signal 114 can be a first sweep of frequencies (e.g., a first frequency sweep) within the first resonant frequency band of the ultrasonic transducer 106 mechanically coupled to the optical surface 104. The second frequency 120 of the second signal 118 is within the second resonant frequency band of the ultrasonic transducer 106 mechanically coupled to the optical surface 104. In some examples, the second frequency 120 of the second signal 118 can be a second sweep of frequencies (e.g., a second frequency sweep) within the second resonant frequency band of the ultrasonic transducer 106 mechanically coupled to the optical surface 104. The first frequency 116 of the first signal 114 can be different than the second frequency 120 of the second signal 118. The first frequency sweep can be different than the second frequency sweep. The first resonant frequency band can be different than the second resonant frequency band.

As shown in the example of FIG. 1, the first area 108A can have a first width dimension W108A that can be greater than a corresponding width W102A of the first size 102A of the droplet 102. The first width dimension W108A of the first area 108A can be greater than a corresponding width W102B of the second size 102B of the droplet 102. The first width dimension W108A of the first area 108A can be greater than a corresponding width W102C of the third size 102C of the droplet 102.

Similarly, as shown in the example of FIG. 1, the second area 110A can have a first width dimension W110A that can be greater than a corresponding width W102A of the first size 102A of the droplet 102. The second width dimension W110A of the second area 110A can be greater than a corresponding width W102B of the second size 102B of the droplet 102. The second width dimension W110A of the second area 108A can be greater than a corresponding width W102C of the third size 102C of the droplet 102.

Figure 2A:
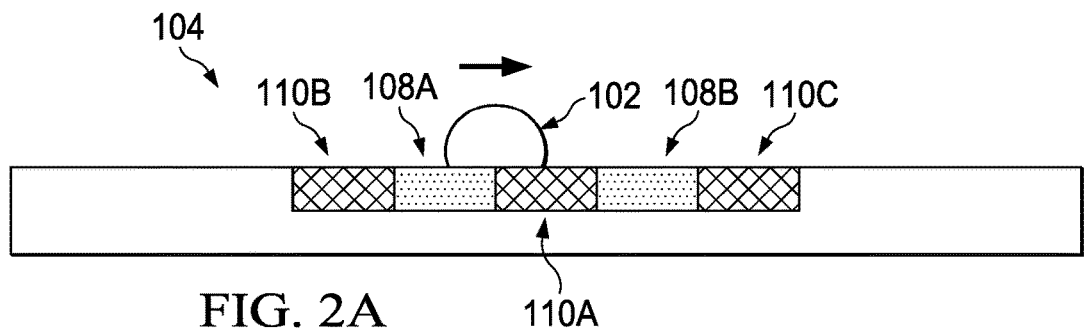
FIG. 2A is a simplified cross sectional view according to an embodiment of the droplet received at the optical surface (e.g., located on the optical surface) under surface wetting control.
Figure 2B:
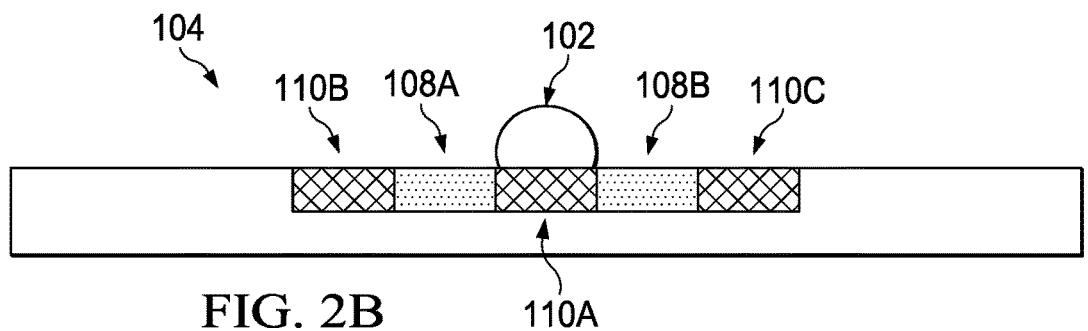
FIG. 2B is a cross sectional view according to an embodiment, similar to FIG. 2A, but showing movement of the droplet at the optical surface (e.g., on the optical surface) under surface wetting control.
Figure 2C:
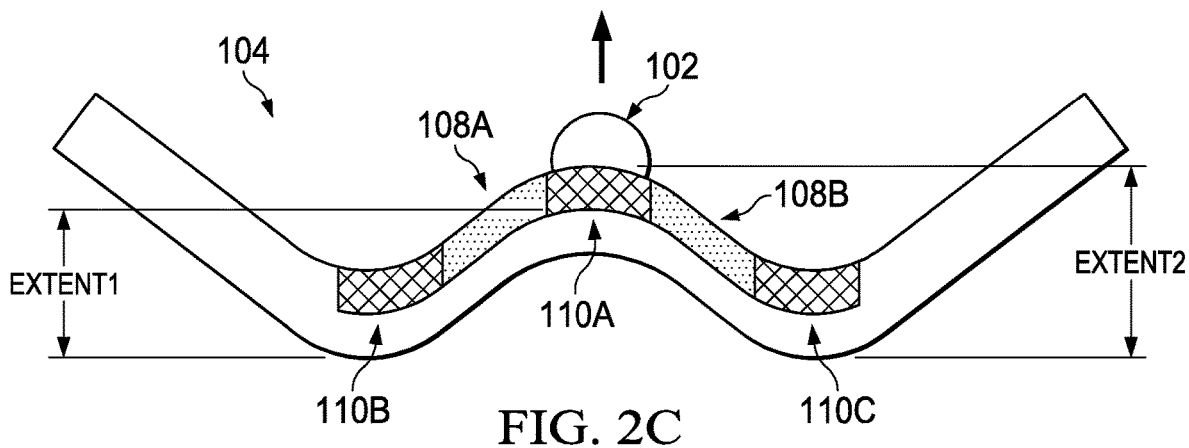
FIG. 2C is a cross sectional view according to an embodiment, similar to FIG. 2B, but showing vibration to expel fluid from the droplet at the optical surface (e.g., on the optical surface) under surface wetting control.

FIG. 2A is a simplified cross sectional view according to an embodiment of the droplet 102 received at the optical surface 104 (e.g., located on the optical surface 104) under surface wetting control. FIG. 2B is a cross sectional view according to an embodiment, similar to FIG. 2A, but showing movement of the droplet 102 at the optical surface 104 under surface wetting control. FIG. 2C is a cross sectional view according to an embodiment, similar to FIG. 2B, but showing vibration to expel fluid from the droplet 102 at the optical surface 104 under surface wetting control.

The first areas 108A, 108B are shown in the examples of FIGS. 2A-2C using stippling. The second areas 110A, 110B, 110C are shown in the examples of FIGS. 2A-2C using cross hatching. The examples of FIGS. 2A-2C show the alternating patterned arrangement in cross sectional view of the first areas (e.g., first areas 108A, 108B) and the second areas (e.g., second areas 110A, 110B, 110C). For example, a member of the first areas (e.g., first area 108A) can be interposed between a pair of members of the second areas (e.g., pair of second areas 110A, 110B). Another member of the first areas (e.g., first area 108B) can be interposed between another pair of members of the second areas (e.g., pair of second areas 110A, 110C). A member of the second areas (e.g., second area 110A) can be interposed between a pair of members of the first areas (e.g., pair of first areas 108A, 108B).

In the examples of FIGS. 2A-2C, the second wettability of the second areas 110A, 110B, 110C of the optical surface 104 can be greater than the first wettability of the first areas 108A, 108B of the optical surface 104. For example, the hydrophobic coating can be applied to the first areas 108A, 108B so as to limit the wettability of the first areas 108A, 108B. For example, application of the hydrophobic coating to the second areas 110A, 110B, 110C can be avoided, so that second wettability of the second areas 110A, 110B, 110C of the optical surface 104 can be greater than the first wettability of the first areas 108A, 108B.

The second wettability of the second areas 110A, 110B, 110C of the optical surface 104 is sufficiently greater than the first wettability of the first areas 108A, 108B of the optical surface 104 to cause at least some movement of the droplet 102 from the first area 108A to the second area 110A. FIG. 2A shows droplet 102 partially received at (e.g., partially located on) the first area 108A having the first wettability and partially received at (e.g., partially located on) the second area 110A having the second wettability. Since the second wettability is greater than the first wettability, a notional block arrow is shown in FIG. 2A to depict movement of the droplet 102 from the first area 108A to the second area 110 A. Further, comparison of FIG. 2A to FIG. 2B shows that in FIG. 2B the droplet has moved to the second area 110A, from being partially received at (e.g., partially located on) the first area 108A and partially received at (e.g., partially located on) the second area 110A in FIG. 2A.

The ultrasonic transducer 106 described above with respect to FIG. 1 can excite a vibrational mode of the optical surface 104 having a greater extent of vibration at the second area 110A than at the first area 108A. For example, FIG. 2C shows the vibrational mode of the optical surface 104 having a first extent of vibration (e.g., EXTENT1) at the first area 108A and having a second extent of vibration (e.g., EXTENT2) at the second area 110A. As shown in the example of FIG. 2C, the second extent of vibration (e.g., EXTENT2) at the second area 110A is greater than the first extent of vibration (e.g., EXTENT1) at the first area 108A. For example, the relatively greater wettability of the second area 110A can move the droplet 102, where the relatively greater extent of vibration (e.g., EXTENT2) can expel fluid from the droplet by atomization. For example, regions of greatest wettability (e.g. second area 110A) can be placed at locations of largest vibration amplitude. In the example of FIG. 2C, a notional upward block arrow is used to depict the relatively greater extent of vibration (e.g., EXTENT2) expelling fluid from the droplet 102 by atomization.

Figure 3A:
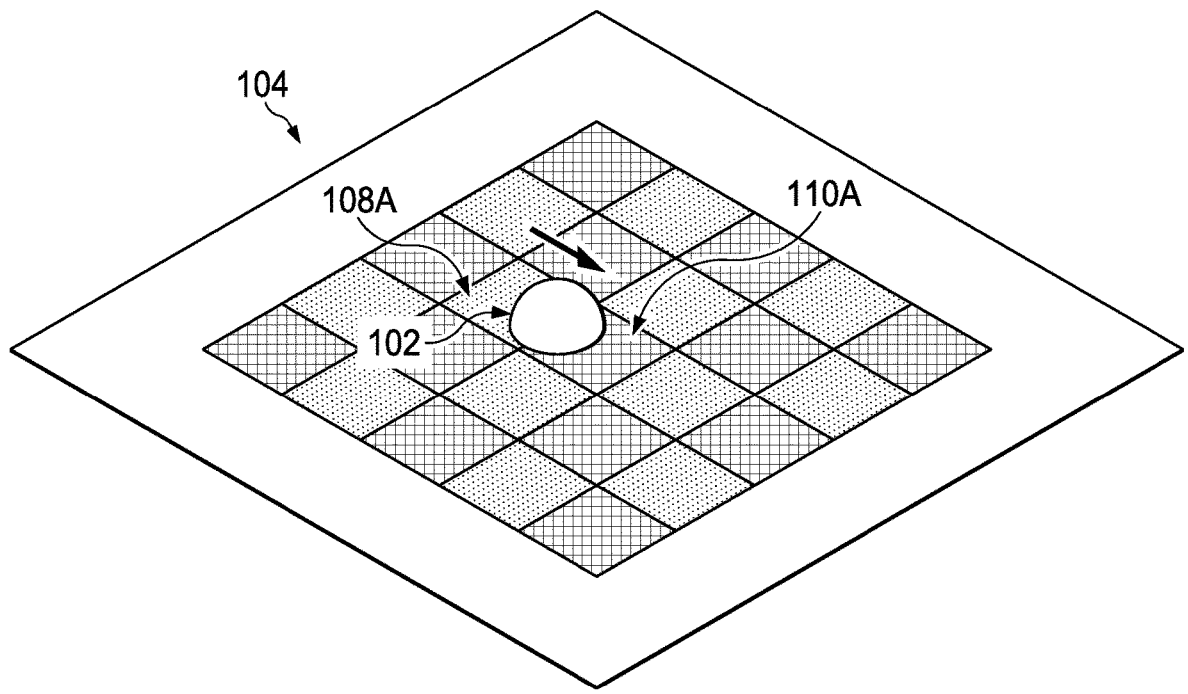
FIG. 3A is a simplified perspective view according to an embodiment, similar to FIG. 2A showing the droplet received at the optical surface (e.g., located on the optical surface) under surface wetting control.
Figure 3B:
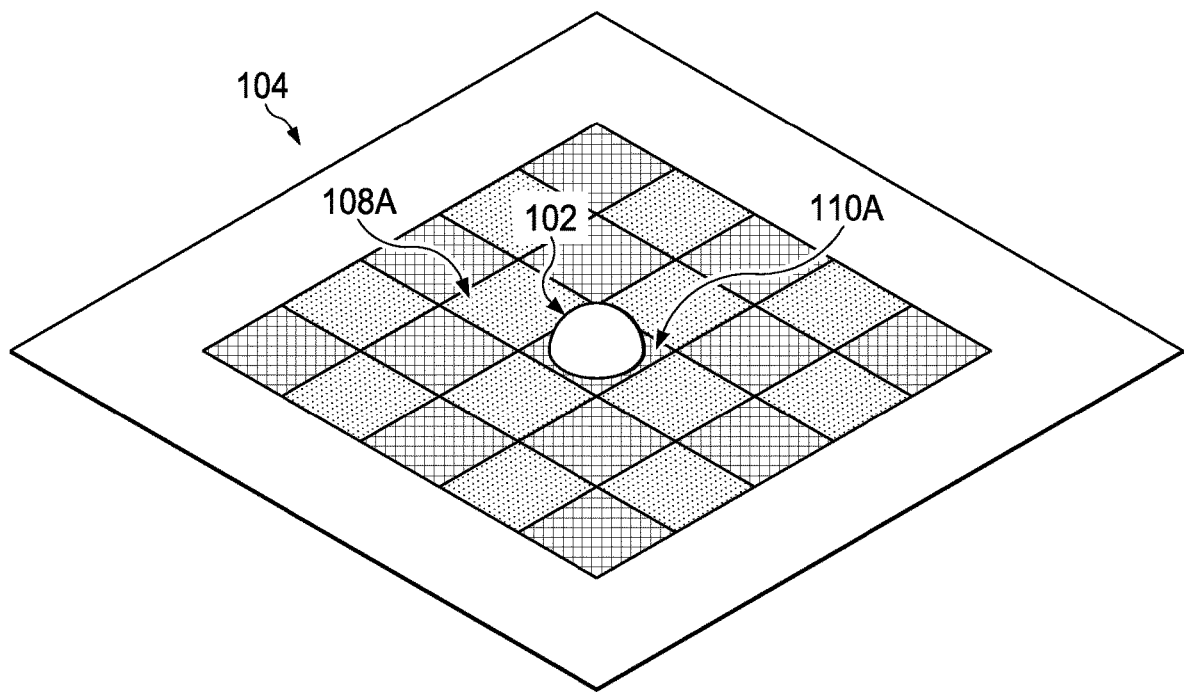
FIG. 3B is a perspective view according to an embodiment, similar to FIG. 3A, but showing movement of the droplet at the optical surface (e.g., on the optical surface) under surface wetting control.
Figure 3C:
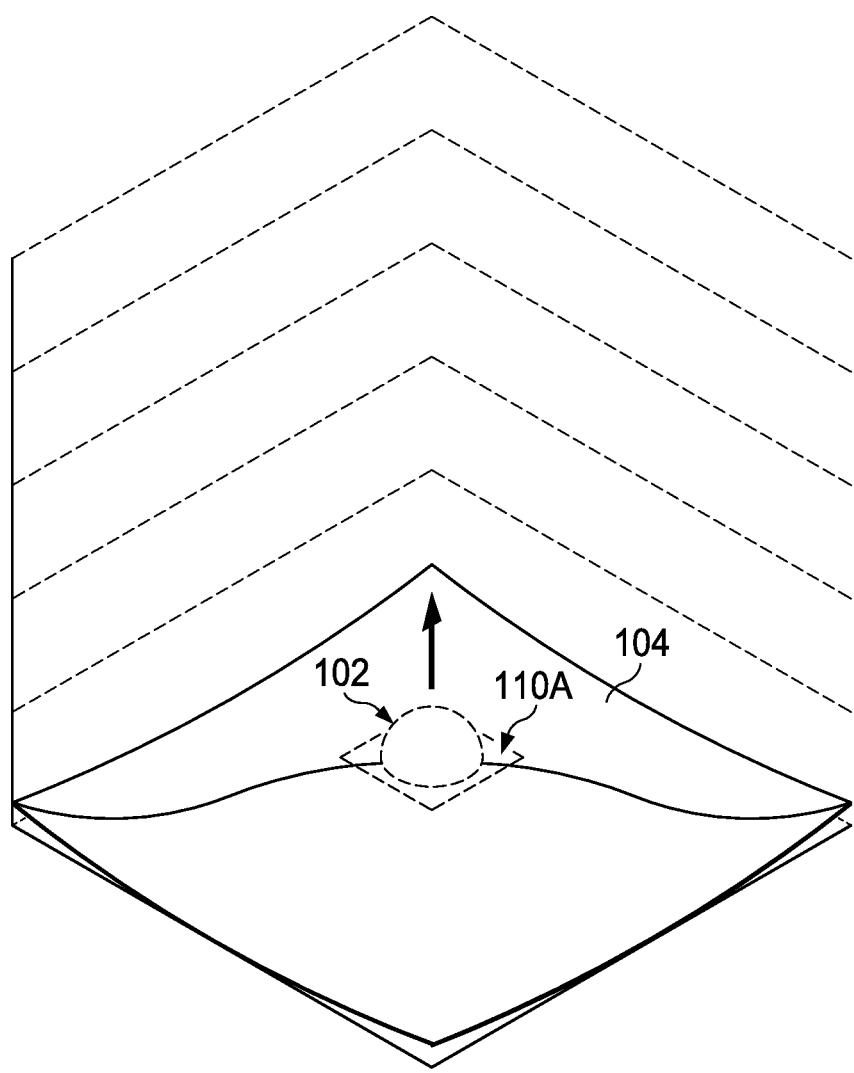
FIG. 3C is a perspective view according to an embodiment, similar to FIG. 3B, but showing vibration to expel fluid from the droplet at the optical surface (e.g., on the optical surface) under surface wetting control.

FIG. 3A is a simplified perspective view according to an embodiment, similar to FIG. 2A showing the droplet 102 received at the optical surface 104 (e.g., located on the optical surface 104) under surface wetting control. FIG. 3B is a perspective view according to an embodiment, similar to FIG. 3A, but showing movement of the droplet 102 at the optical surface 104 under surface wetting control. FIG. 3C is a perspective view according to an embodiment, similar to FIG. 3B, but showing vibration to expel fluid from the droplet 102 at the optical surface 104 under surface wetting control. The first areas are shown in the examples of FIGS. 3A-3B using stippling. The second areas are shown in the examples of FIGS. 3A-3B using cross hatching. The examples of FIGS. 3A-3B show the alternating patterned arrangement in perspective view of the first areas and the second areas.

The second wettability of the second area 110A of the optical surface 104 is sufficiently greater than the first wettability of the first area 108A of the optical surface 104 to cause at least some movement of the droplet 102 from the first area 108A to the second area 110A. FIG. 3A shows droplet 102 partially received at (e.g., partially located on) the first area 108A having the first wettability and partially received at (e.g., partially located on) the second area 110A having the second wettability. Since the second wettability is greater than the first wettability, a notional block arrow is shown in FIG. 3A to depict movement of the droplet 102 from the first area 108A to the second area 110 A. Further, comparison of FIG. 3A to FIG. 3B shows that in FIG. 3B the droplet has moved to the second area 110A, from being partially received at (e.g., partially located on) the first area 108A and partially received at (e.g., partially located on) the second area 110A in FIG. 3A.

For example, the relatively greater wettability of the second area 110A can move the droplet 102, where the relatively greater extent of vibration can expel fluid from the droplet by atomization. In the example of FIG. 3C, a notional upward block arrow is used to depict the relatively greater extent of vibration expelling fluid from the droplet 102 by atomization. For ease of viewing, depiction of vibration is simplified in FIG. 3C, and both the second area 110A and the droplet 102 are depicted using a stippled line style.

Figure 4A:
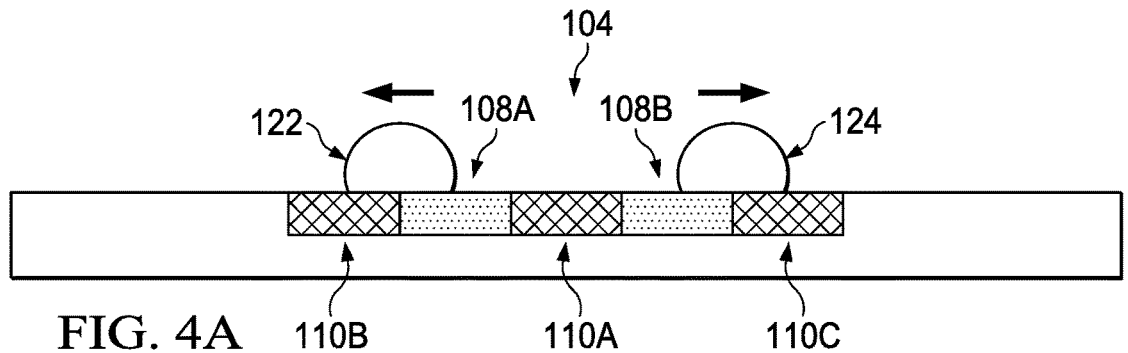
FIG. 4A is a simplified cross sectional view according to an embodiment of second and third droplets received at the optical surface (e.g., located on the optical surface) under surface wetting control.
Figure 4B:
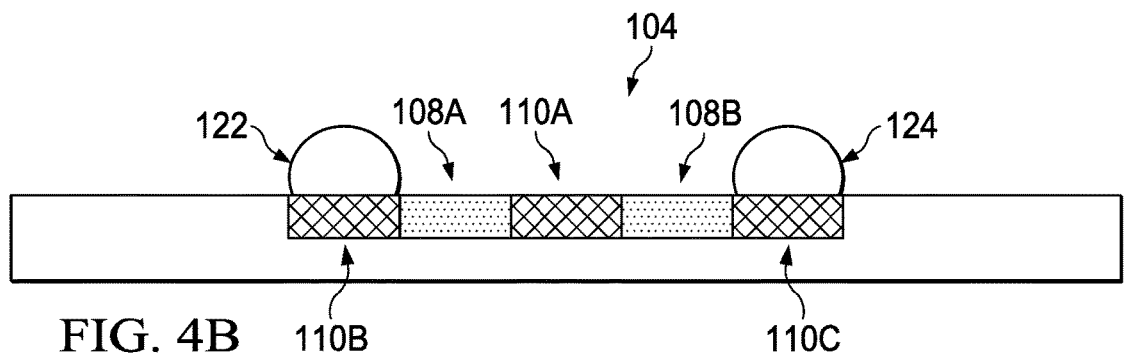
FIG. 4B is a cross sectional view according to an embodiment, similar to FIG. 4A, but showing movement of the second and third droplets at the optical surface under surface wetting control.

While a droplet 102 is shown, and described above with respect to FIG. 1, FIGS. 2A-2C, and FIGS. 3A-3B, the foregoing is likewise applicable to additional droplets, for example, a second droplet and a third droplet. FIG. 4A is a simplified cross sectional view according to an embodiment of a second droplet 122 and a third droplet 124 received at the optical surface 104 (e.g., located on the optical surface 104) under surface wetting control. FIG. 4B is a cross sectional view according to an embodiment, similar to FIG.

Figure 4C:
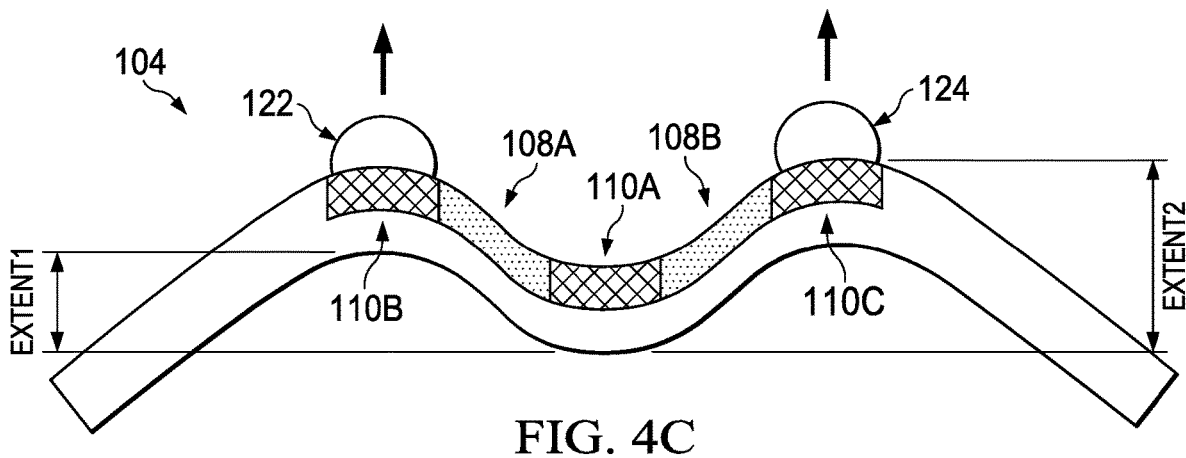
FIG. 4C is a cross sectional view according to an embodiment, similar to FIG. 4B, but showing vibration to expel fluid from the second and third droplets at the optical surface under surface wetting control.

4A, but showing movement of the second droplet 122 and the third droplet 124 at the optical surface 104 under surface wetting control. FIG. 4C is a cross sectional view according to an embodiment, similar to FIG. 4B, but showing vibration to expel fluid from the second droplet 122 and the third droplet 124 at the optical surface 104 under surface wetting control.

In the examples of FIGS. 4A-4C, the second wettability of the second areas 110A, 110B, 110C of the optical surface 104 can be greater than the first wettability of the first areas 108A, 108B of the optical surface 104. For example, the second wettability of the second areas 110B, 110C of the optical surface 104 is sufficiently greater than the first wettability of the first areas 108A, 108B of the optical surface to cause at least some movement of the second and third droplets 122, 124 from the first areas 108A, 108B to the second areas 110B, 110C. The example of FIG. 4A shows second droplet 122 partially received at (e.g., partially located on) one of the first areas 108A having the first wettability and partially received at (e.g., partially located on) one the second areas 110B having the second wettability. Similarly, the example of FIG. 4A also shows third droplet 124 partially received at (e.g., partially located on) another one of the first areas 108B having the first wettability and partially received at (e.g., partially located on) another one the second areas 110C having the second wettability. Since the second wettability is greater than the first wettability, notional block arrows are shown in FIG. 4A to depict movement of the second droplet 122 from the one of the first areas 108A to one of the second areas 110 B, and to depict movement of the third droplet 124 from another one of the first areas 108B to another one of the second areas 110C. Further, comparison of FIG. 4A to FIG. 4B shows that in FIG. 4B the second droplet 122 has moved to the one of the second areas 110B, from being partially received at (e.g., partially located on) one of the first areas 108A and partially received at (e.g., partially located on) the one of the second areas 110B in FIG. 4A. In FIG. 4B the third droplet 124 has moved to another one of the second areas 110C, from being partially received at (e.g., partially located on) another one of the first areas 108B and partially received at (e.g., partially located on) another one of the second areas 110C in FIG. 4A.

For example, FIG. 4C shows the vibrational mode of the optical surface 104 having a first extent of vibration (e.g., EXTENT1) at first areas 108A, 108B and having a second extent of vibration (e.g., EXTENT2) at one and another one of the second areas 110B, 110C. As shown in the example of FIG. 4C, the second extent of vibration (e.g., EXTENT2) at one and another one of the second areas 110B, 110C is greater than the first extent of vibration (e.g., EXTENT1) at the first areas 108A, 108B. For example, the relatively greater wettability of one and another one of the second areas 110B, 110C can move the second and third droplets 122, 124, where the relatively greater extent of vibration (e.g., EXTENT2) can expel fluid from the droplet by atomization. For example, regions of greatest wettability (e.g. second areas 110B, 110C) can be placed at locations of largest vibration amplitude. In the example of FIG. 4C, notional upward block arrows are used to depict the relatively greater extent of vibration (e.g., EXTENT2) expelling fluid from the second and third droplets 122, 124 by atomization. An added benefit is when droplets that are smaller than a given region fall onto the surface, they will still tend to migrate to the locations of largest vibration amplitude due to an acceleration gradient across the droplet.

Figure 5A:
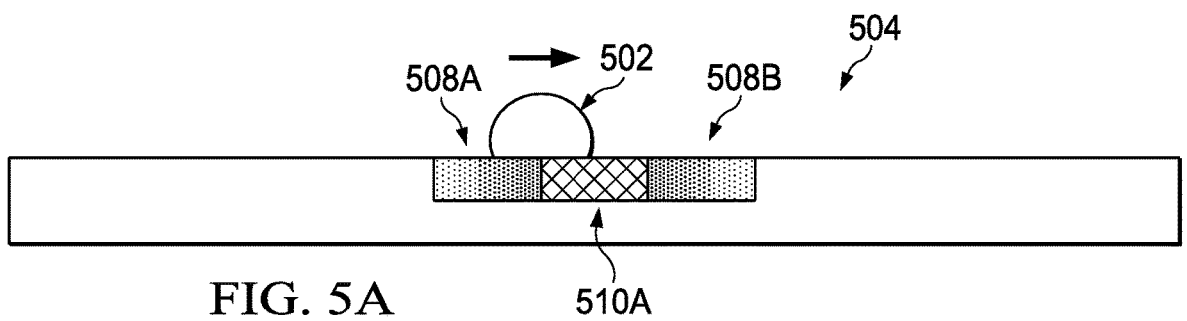
FIG. 5A is a simplified cross sectional view according to another embodiment of the droplet received at the optical surface (e.g., located on the optical surface) under gradient control of surface wetting.
Figure 5B:
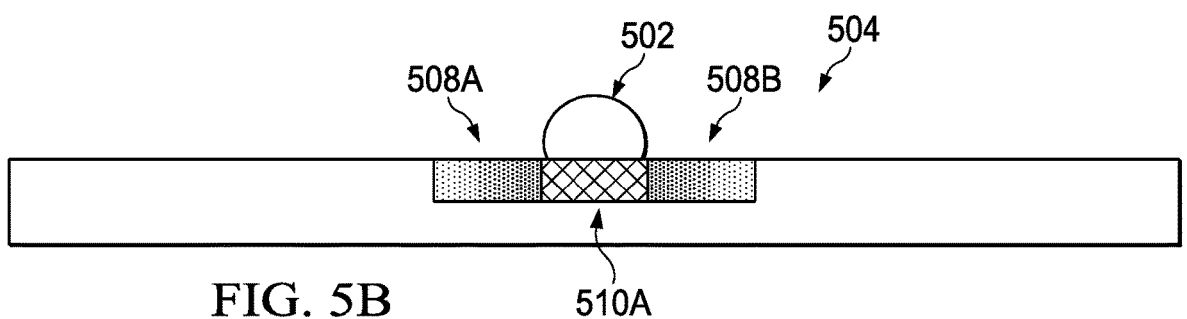
FIG. 5B is a cross sectional view according to an embodiment, similar to FIG. 5A, but showing movement of the droplet at the optical surface (e.g., on the optical surface) under gradient control of surface wetting.
Figure 5C:
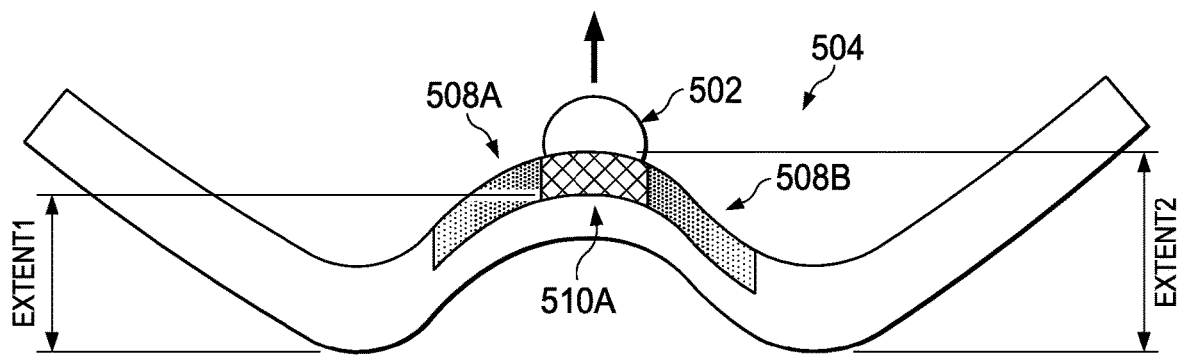
FIG. 5C is a cross sectional view according to an embodiment, similar to FIG. 5B, but showing vibration to expel fluid from the droplet at the optical surface (e.g., on the optical surface) under gradient control of surface wetting.

FIG. 5A is a simplified cross sectional view according to another embodiment of the droplet 502 received at the optical surface 504 (e.g., located on the optical surface 504) under gradient control of surface wetting. FIG. 5B is a cross sectional view according to an embodiment, similar to FIG. 5A, but showing movement of the droplet 502 at the optical surface 504 under gradient control of surface wetting. FIG. 5C is a cross sectional view according to an embodiment, similar to FIG. 5B, but showing vibration to expel fluid from the droplet 502 at the optical surface 504 under gradient control of surface wetting.

A first area 508A having an increasing gradient of wettability in a direction towards second area 510A is shown in the examples of FIGS. 5A-5C using an increasingly darkened gradient depiction in the direction towards second area 510A. Similarly, additional first area 508B having an increasing gradient of wettability in an additional direction towards second area 510A is shown in the examples of FIGS. 5A-5C using an increasingly darkened gradient depiction in the additional direction towards second area 510A. The second area 510A is shown in the examples of FIGS. 5A-5C using cross hatching. The examples of FIGS. 5A-5C show the increasing wettability gradient patterned arrangement in cross sectional view of the first areas (e.g., first areas 508A, 508B) and the second area (e.g., second area 510A). For example, a second area 510A can be interposed between a pair of members of the first areas (e.g., pair of first areas 508A, 508B). For example, second area 510A can be centrally arranged between first area 508A and additional first area 508B. For example, the first area 508A can have an increasing gradient of wettability in a centrally oriented direction towards second area 510A, as shown in the examples of FIGS. 5A-5C using an increasingly darkened gradient depiction in the centrally oriented direction towards second area 510A. Similarly, additional first area 508B can have an increasing gradient of wettability in an additional centrally oriented direction towards second area 510A as shown in the examples of FIGS. 5A-5C using an increasingly darkened gradient depiction in the additional centrally oriented direction towards second area 510A. For example, the optical surface 504 can have a wettability gradient that increases (e.g. increases monotonically) from peripheral areas of the optical surface 504 (e.g., first area 508A and additional first area 508B) towards a central area of the optical surface 504 (e.g., second area 510A).

In the examples of FIGS. 5A-5C, the second wettability of the second area 510A of the optical surface 504 can be greater than the first gradient wettability of the first areas 508A, 508B of the optical surface 504. For example, the hydrophobic coating can be applied in a suitable gradient manner, for example using inkjet printing, to the first areas 508A, 508B so as to limit the wettability of the first areas 508A, 508B in a gradient manner. For example, application of the hydrophobic coating to the second area 510A can be avoided, so that second wettability of the second area 510A of the optical surface 504 can be greater than the first gradient wettability of the first areas 508A, 508B.

The second wettability of the second area 510A of the optical surface 504 is sufficiently greater than the first gradient wettability of the first areas 508A, 508B of the optical surface 504 to cause at least some movement of the droplet 502 from the first area 508A to the second area 510A. FIG. 5A shows droplet 502 partially received at (e.g., partially located on) the first area 508A having the first gradient wettability and partially received at (e.g., partially located on) the second area 510A having the second wettability. Since the second wettability is greater than the first gradient wettability, a notional block arrow is shown in FIG. 5A to depict movement of the droplet 502 from the first area 508A to the second area 510 A. Further, comparison of FIG. 5A to FIG. 5B shows that in FIG. 5B the droplet has moved to the second area 510A, from being partially received at (e.g., partially located on) the first area 508A and partially received at (e.g., partially located on) the second area 510A in FIG. 5A. For example, since the optical surface 504 can have a wettability gradient that increases (e.g. increases monotonically) from peripheral areas of the optical surface 504 (e.g., first area 508A and additional first area 508B) towards a central area of the optical surface 504 (e.g., second area 510A), the droplet 502 can be moved thereby from peripheral areas of the optical surface 504 (e.g., from first area 508A) towards the central area of the optical surface 504 (e.g., towards second area 510A).

The ultrasonic transducer 106 described above with respect to FIG. 1 can excite a vibrational mode of the optical surface 504 having a greater extent of vibration at the second area 510A than at the first area 508A. For example, FIG. 5C shows the vibrational mode of the optical surface 504 having a first extent of vibration (e.g., EXTENT1) at the first area 508A and having a second extent of vibration (e.g., EXTENT2) at the second area 510A. As shown in the example of FIG. 5C, the second extent of vibration (e.g., EXTENT2) at the second area 510A is greater than the first extent of vibration (e.g., EXTENT1) at the first area 508A. For example, the relatively greater wettability of the second area 510A can move the droplet 502, where the relatively greater extent of vibration (e.g., EXTENT2) can expel fluid from the droplet by atomization. For example, regions of greatest wettability (e.g. second area 510A) can be placed (e.g., centrally placed) at locations of largest vibration amplitude. In the example of FIG. 5C, a notional upward block arrow is used to depict the relatively greater extent of vibration (e.g., EXTENT2) expelling fluid from the droplet 502 by atomization.

Figure 5D:
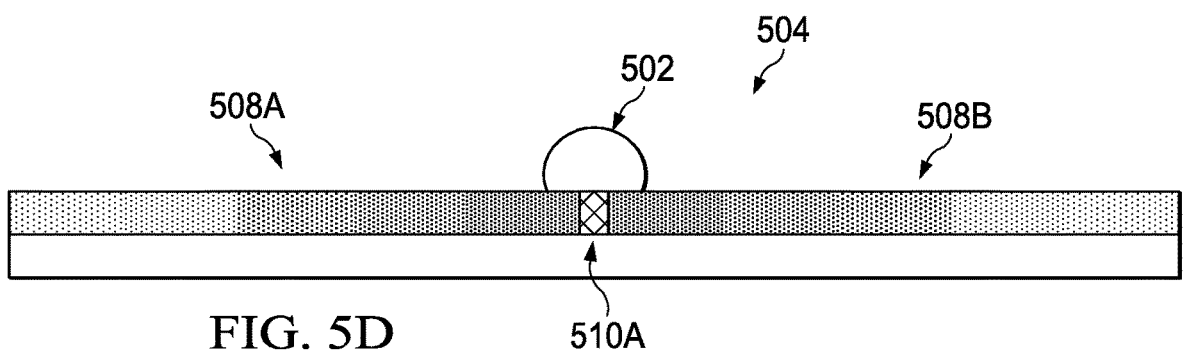
FIG. 5D is a cross sectional view according to another embodiment, similar to FIG. 5B, but with first areas much larger than the droplet and with a second area much smaller than the droplet.

FIG. 5D is a cross sectional view according to another embodiment, similar to FIG. 5B, but with first areas 508A, 508B much larger than the droplet 502 and with a second area 510A much smaller than the droplet 502. In some examples, the second area 510A can be an order of magnitude smaller than the droplet 502 (e.g., at least an order of magnitude smaller than the droplet 502, or even smaller). In the example of FIG. 5D, the first area 508A can have the increasing gradient of wettability in the centrally oriented direction towards second area 510A, as shown in FIG. 5D using the increasingly darkened gradient depiction in the centrally oriented direction towards second area 510A. Similarly, additional first area 508B can have the increasing gradient of wettability in the additional centrally oriented direction towards second area 510A as shown in FIG. 5D using the increasingly darkened gradient depiction in the additional centrally oriented direction towards second area 510A. For example, the optical surface 504 shown in FIG. 5D can have the wettability gradient that increases (e.g. increases monotonically) from peripheral areas of the optical surface 504 (e.g., first area 508A and additional first area 508B) towards the central area of the optical surface 504 (e.g., second area 510A).

In additional other examples, the first areas and/or second areas can be smaller than the droplet (e.g., an order of magnitude smaller than the droplet, e.g., at least an order of magnitude smaller than the droplet, or smaller). In some examples, respective members of the first areas 108A, 108B, 108C, 108D, 108E, 108F, 108G, 108H, 108I, 108J, 108K, 108L shown in FIG. 1 can be smaller than the droplet 102 (e.g., an order of magnitude smaller than the droplet, e.g., at least an order of magnitude smaller than the droplet, or smaller). In some examples, respective members of the second areas 110A, 110B, 110C, 110D, 110E, 110F, 110G, 110H, 110I, 110J, 110K, 110L, 110M can be smaller than the droplet 102 (e.g., an order of magnitude smaller than the droplet, e.g., at least an order of magnitude smaller than the droplet, or smaller).

Figure 5E:
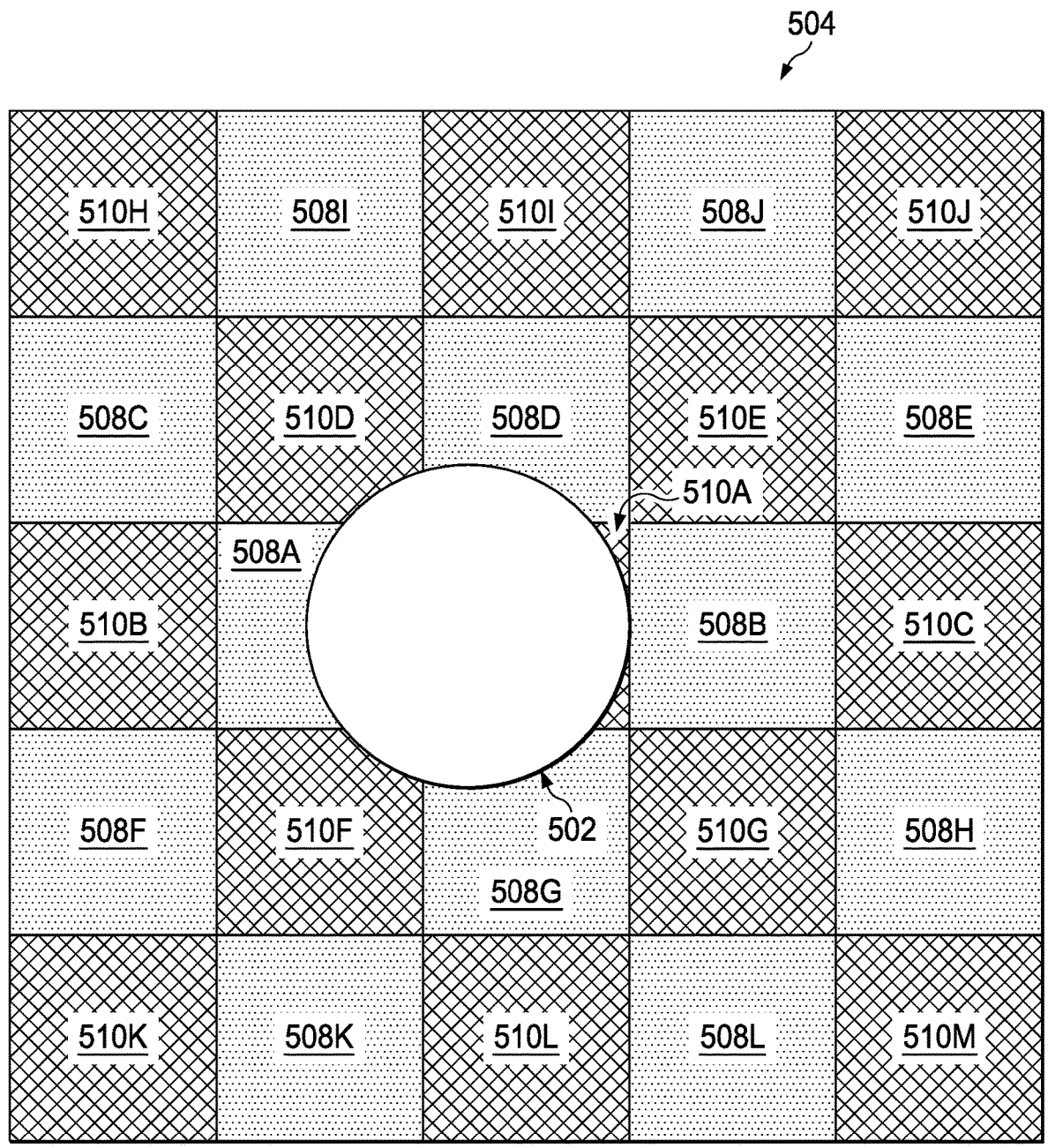
FIG. 5E is a simplified view similar to what is shown in FIG. 1, but with first and second areas shown much smaller than the droplet.

FIG. 5E is a simplified view similar to what is shown in FIG. 1, but with first areas 508A, 508B, 508C, 508D, 508E, 508F, 508G, 508H, 508I, 508J, 508K, 508L and second areas 510A, 510B, 510C, 510D, 510E, 510F, 510G, 510H, 510I, 510J, 510K, 510L, 510M shown much smaller than the droplet 502 on optical surface 504. Second wettability of the second areas of the optical surface 504 can be greater than the first wettability of the first areas. The first areas are shown in the example of FIG. 5E using stippling. The second areas are shown in the example of FIG. 5E using cross hatching.

FIG. 6A is a diagram 600a of impedance (Ohms in decibels) versus frequency (logarithmic scale in kilohertz) for an example ultrasonic transducer mechanically coupled to an example optical surface according to an embodiment. FIG. 6A shows the example first frequency of three-hundred kilohertz for the example ultrasonic transducer mechanically coupled to the example optical surface. The example first frequency of the example three-hundred kilohertz can correspond to a first nominal resonance frequency of a first low impedance resonance extremity 602 in the diagram of FIG. 6A at the first frequency of the example ultrasonic transducer mechanically coupled to the example optical surface. The example first frequency of three-hundred kilohertz can correspond to the first nominal resonance frequency of the first low impedance resonance extremity 602 that is centered within a first resonance band "602band". More broadly, the first frequency is within a first resonance band "602band". The first resonance band is defined herein as extending in frequency to plus and minus ten percent of the first nominal resonance frequency of the first low impedance resonance extremity for the ultrasonic transducer mechanically coupled to the optical surface. For example, with the example first frequency of three-hundred kilohertz, the first resonance band extends in frequency to plus and minus ten percent of the first nominal resonance frequency of three-hundred kilohertz (e.g. the first resonance band extends in frequency to plus and minus thirty kilohertz from the three-hundred kilohertz, or the first resonance band extends in frequency from two-hundred-and-seventy kilohertz to three-hundred-and-thirty kilohertz).

Further, FIG. 6A shows the example second frequency of twenty-six kilohertz for the example ultrasonic transducer mechanically coupled to the example optical surface. The example second frequency of twenty-six kilohertz corresponds to a second nominal resonance frequency of a second low impedance resonance extremity 604 in the diagram of FIG. 6A at the second frequency of the example ultrasonic transducer mechanically coupled to the example optical surface. The example second frequency of twenty-six kilohertz corresponds to the second nominal resonance frequency of the second low impedance resonance extremity 604 that is centered within a second resonance band "604band". More broadly, the second frequency is within a second resonance band "604band". The second resonance band is defined herein as extending in frequency to plus and minus ten percent of the second nominal resonance frequency of the second low impedance resonance extremity for the ultrasonic transducer mechanically coupled to the optical surface. For example, with the example second frequency of twenty-six kilohertz, the second resonance band extends in frequency to plus and minus ten percent of the second nominal resonance frequency of twenty-six kilohertz (e.g. the second resonance band extends in frequency to plus and minus two and six-tenths kilohertz from the twenty-six kilohertz, or the second resonance band extends in frequency from twenty-three-and-four-tenths kilohertz to twenty-eight-and-six-tenths kilohertz).

FIG. 6B is a diagram 600b of example droplet size reduction versus frequency according to an embodiment. The example of FIG. 6B shows the example first frequency of the example three-hundred kilohertz for the example ultrasonic transducer mechanically coupled to the example optical surface. As shown in the example of FIG. 6B, the example first frequency 602 of the example three-hundred kilohertz can reduce the droplet from the first droplet size 606 (e.g., reduce from ten millimeters in droplet diameter) to the second droplet size 608 (e.g., reduce to four millimeters in droplet diameter). Further, the example of FIG. 6B shows the example second frequency 604 of twenty-six kilohertz for the example ultrasonic transducer mechanically coupled to the example optical surface. As shown in the example of FIG. 6B, the example second frequency 604 of twenty-six kilohertz can reduce the droplet from the second droplet size 608 (e.g., reduce from four millimeters in droplet diameter) to the third droplet size 610 (e.g., reduce to eight-tenths of a millimeter in droplet diameter).

While example manners of implementing the example system 100 for expelling fluid from a droplet 102 from an optical surface 104 using the ultrasonic transducer 106 mechanically coupled to the optical surface 104 under wettability control as in FIG. 1, one or more of the elements, processes and/or devices illustrated in FIG. 1 may be combined, divided, re-arranged, omitted, eliminated and/or implemented in any other way.

Further, the example system 100, example optical surface 104, 504, example ultrasonic transducer 106, example first areas 108A, 108B, 108C, 108D, 108E, 108F, 108G, 108H, 108I, 108J, 108K, 108L, 508A, example second areas 110A, 110B, 110C, 110D, 110E, 110F, 110G, 110H, 110I, 110J, 110K, 110L, 110M, 510A, 510B, example edge of the first area 108AE, example edge of second area 110AE, example signal generator 112, example first signal 114, example first frequency 116, example second signal 118, example second frequency 120, example width of first area W108A, example width of second area W110A, example first extent of vibration EXTENT1, example second extent of vibration EXTENT2, example first low impedance resonance extremity 602, example first resonance band 602band, example second low impedance resonance extremity 604, and example second resonance band 604band of the example of FIG. 1 may be implemented by hardware, software, firmware and/or any combination of hardware, software and/or firmware, and may be implemented by one or more analog or digital circuit(s), logic circuits, programmable processor (s), application specific integrated circuit(s) (ASIC(s)), programmable logic device(s) (PLD(s)) and/or field programmable logic device(s) (FPLD(s)).

Further still, the example system 100, example optical surface 104, 504, example ultrasonic transducer 106, example first areas 108A, 108B, 108C, 108D, 108E, 108F, 108G, 108H, 108I, 108J, 108K, 108L, 508A, example second areas 110A, 110B, 110C, 110D, 110E, 110F, 110G, 110H, 110I, 110J, 110K, 110L, 110M, 510A, 510B, example edge of the first area 108AE, example edge of second area 110AE, example signal generator 112, example first signal 114, example first frequency 116, example second signal 118, example second frequency 120, example width of first area W108A, example width of second area W110A, example first extent of vibration EXTENT1, example second extent of vibration EXTENT2, example first low impedance resonance extremity 602, example first resonance band 602band, example second low impedance resonance extremity 604, and example second resonance band 604band of the example of FIG. 1 may include one or more elements, processes and/or devices in addition to, or instead of, those illustrated in FIG. 1, and/or may include more than one of any or all of the illustrated elements, processes and devices.

When reading any of the apparatus or system claims of this patent to cover a purely software and/or firmware implementation, at least one of the example system 100, example optical surface 104, 504, example ultrasonic transducer 106, example first areas 108A, 108B, 108C, 108D, 108E, 108F, 108G, 108H, 108I, 108J, 108K, 108L, 508A, example second areas 110A, 110B, 110C, 110D, 110E, 110F, 110G, 110H, 110I, 110J, 110K, 110L, 110M, 510A, 510B, example edge of the first area 108AE, example edge of second area 110AE, example signal generator 112, example first signal 114, example first frequency 116, example second signal 118, example second frequency 120, example width of first area W108A, example width of second area W110A, example first extent of vibration EXTENT1, example second extent of vibration EXTENT2, example first low impedance resonance extremity 602, example first resonance band 602band, example second low impedance resonance extremity 604, and example second resonance band 604band of the example of FIG. 1 is/are hereby expressly defined to include a tangible computer readable storage device or storage disk such as a memory, a digital versatile disk (DVD), a compact disk (CD), a Blu-ray disk, etc. storing the software and/or firmware.

Figure 7:
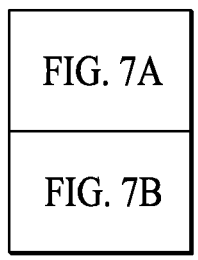
FIGS. 7A-7B show a flowchart representative of example machine readable instructions that may be executed to implement the example system to expel fluid from the droplet under surface wetting, according to an embodiment as shown in the example of FIG. 1.
Figure 7A:
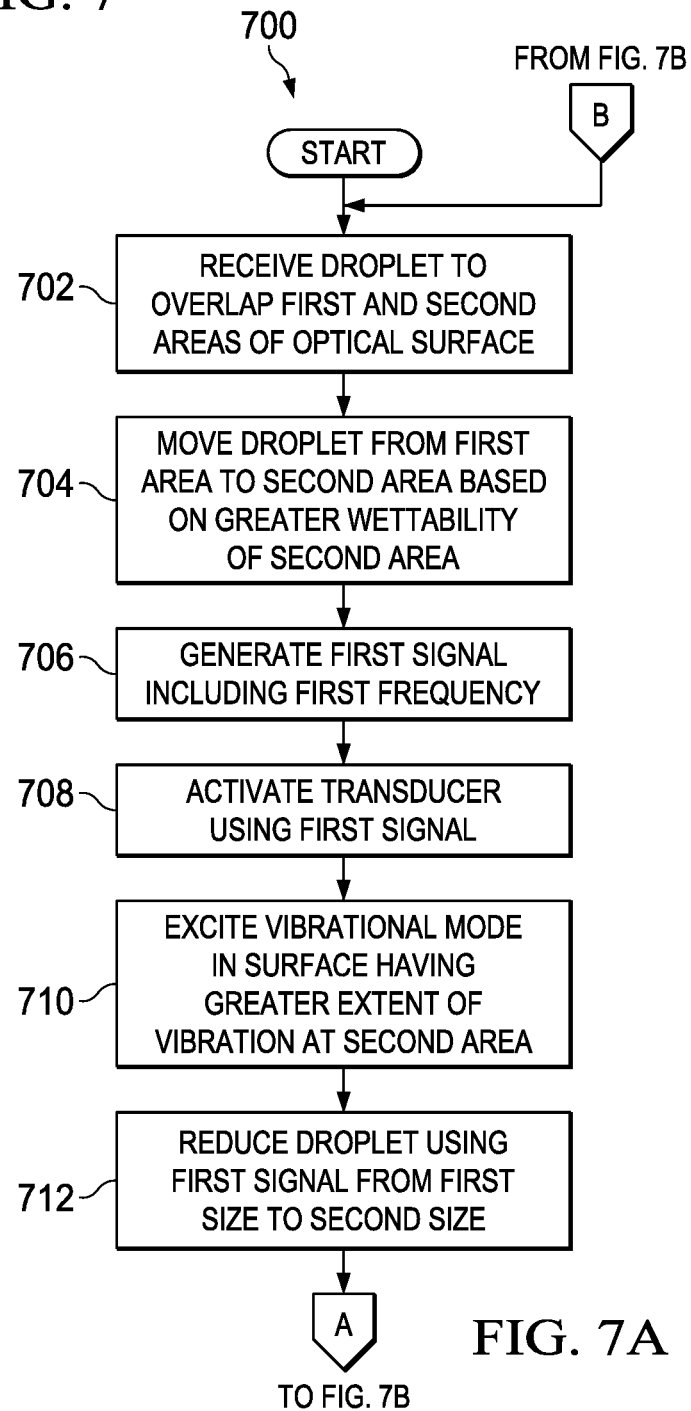
Figure 7B:
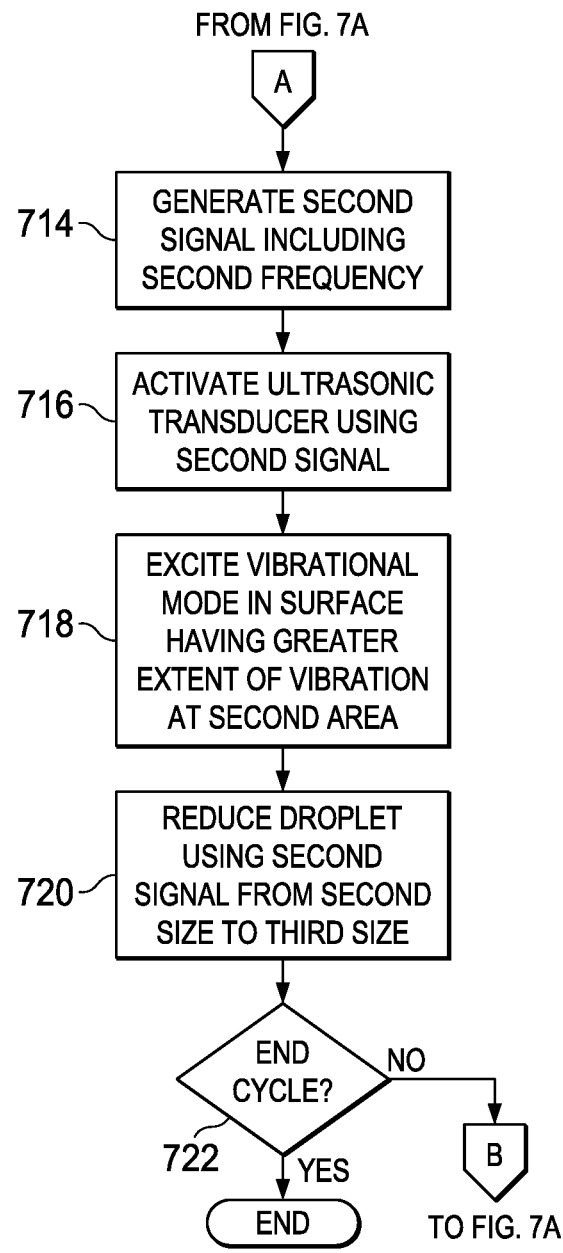

FIGS. 7A-7B show a flowchart representative of example machine readable instructions that may be executed to implement the example system 100 to expel fluid from the droplet 102 on the optical surface 104 under wettability control, according to an embodiment as shown in the example of FIG. 1. In this example, the machine readable instructions comprise a program for execution by a processor, such as the processor 812 shown in the example processor platform 800 described below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 7A-7B, many other methods of implementing the example system 100 to expel fluid from the droplet 102 on the optical surface 104 under wettability control may alternatively be used. For example, the order of execution of the blocks may be changed, and/or some of the blocks described may be changed, eliminated, or combined.

As described above, the example processes of FIGS. 7A-7B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 7A-7B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

A process flow 700 of FIGS. 7A-7B can begin at block 702. At block 702, the optical surface can receive the first size of the droplet to overlap a first area of the optical surface and a second area of the surface. The first area can have a first wettability for a fluid of the droplet. The second area of the surface can have a second wettability for the fluid, in which the first wettability of the first area of the surface is greater than the second wettability of the second area of the surface. For example, FIG. 2A shows optical surface 104 to receive the first size of the droplet 102 to overlap the first area 108A of the optical surface 104 and the second area 110A of the optical surface 104.

Next, as shown in the example of FIG. 7A, at block 704 there can be at least some movement of the droplet from the first area of the surface to the second area of the surface based on the first wettability of the first area of the surface being greater than the second wettability of the second area of the surface. For example, since the second wettability is greater than the first wettability, a notional block arrow is shown in FIG. 2A to depict movement of the droplet 102 from the first area 108A to the second area 110 A. Further, comparison of FIG. 2A to FIG. 2B shows that in FIG. 2B the droplet has moved to the second area 110A, from being partially received at (e.g., partially located on) the first area 108A and partially received at (e.g., partially located on) the second area 110A in FIG. 2A.

Next, as shown in the example of FIG. 7A, at block 706 the first signal including the first frequency can be generated. For example, the signal generator 112 shown in the example of FIG. 1 can be used to generate the first signal 114 having the first frequency 116. As shown in the example of FIG. 1, the signal generator 112 can be coupled with the ultrasonic transducer 106. The ultrasonic transducer 106 can be mechanically coupled to the optical surface 104.

Next, as shown in the example of FIG. 7A, at block 708 the ultrasonic transducer can be activated using the first signal. As shown in the example of FIG. 1, the signal generator 112 can be coupled with the ultrasonic transducer 106 to activate the ultrasonic transducer 106 using the first signal 114. The first frequency 116 of the first signal 114 can be within the first resonant frequency band of the ultrasonic transducer 106 mechanically coupled to the optical surface 104. In some examples, the first frequency 116 of the first signal 114 can be a first sweep of frequencies (e.g., a first frequency sweep) within the first resonant frequency band of the ultrasonic transducer 106 mechanically coupled to the optical surface 104.

Next, as shown in the example of FIG. 7A, at block 710 the first frequency can excite a vibrational mode of the optical surface having a greater extent of vibration at the second area of the optical surface than at the first area of the optical surface. For example, FIG. 2C shows the vibrational mode of the optical surface 104 having a first extent of vibration (e.g., EXTENT1) at the first area 108A and having a second extent of vibration (e.g., EXTENT2) at the second area 110A. As shown in the example of FIG. 2C, the second extent of vibration (e.g., EXTENT2) at the second area 110A is greater than the first extent of vibration (e.g., EXTENT1) at the first area 108A. For example, the relatively greater wettability of the second area 110A can move the droplet 102, where the relatively greater extent of vibration (e.g., EXTENT2) can expel fluid from the droplet by atomization.

Next, as shown in the example of FIG. 7A, at block 712 the fluid droplet can be reduced by atomization from the first size to a second size using the first signal having the first frequency. As shown in the example of FIG. 1, fluid droplet 102 can be reduced by atomization from the first size 102A to a second size 102B using the first signal 114 having the first frequency 116.

Figure 8:
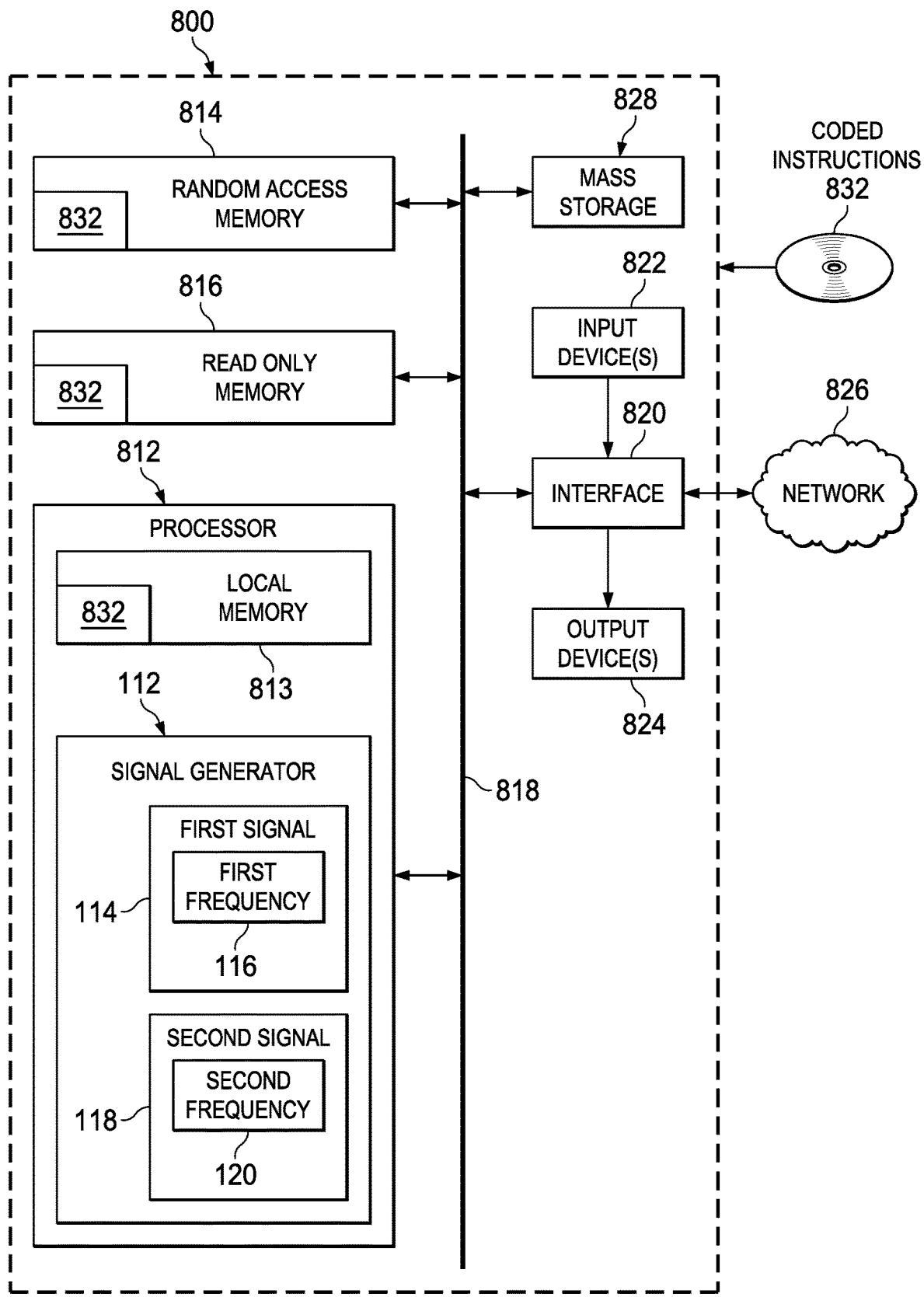
FIG. 8 is a block diagram of an example processing platform capable of executing the machine readable instructions of FIGS. 7A-7B to implement the example system to expel fluid from the droplet under surface wetting control, according to an embodiment as shown in the example of FIG. 1.

Next, as shown in the example of FIG. 7B, at block 714 the second signal including the second frequency can be generated. Next, at block 716 the ultrasonic transducer can be activated using the second signal. The second frequency of the second signal can be within a second resonant frequency band of the ultrasonic transducer mechanically coupled to the optical surface. The second frequency of the second signal can be different than the first frequency of the first signal. The second resonant frequency band can be different than the first resonant frequency band. As shown in the example of FIG. 1, the signal generator 112 can be coupled with the ultrasonic transducer 106 to activate the ultrasonic transducer 106 using the second signal 118.

Next, as shown in the example of FIG. 7B, at block 718 the second frequency can excite a vibrational mode of the optical surface having a greater extent of vibration at the second area of the optical surface than at the first area of the optical surface. For example, FIG. 2C shows the vibrational mode of the optical surface 104 having a first extent of vibration (e.g., EXTENT1) at the first area 108A and having a second extent of vibration (e.g., EXTENT2) at the second area 110A. As shown in the example of FIG. 2C, the second extent of vibration (e.g., EXTENT2) at the second area 110A is greater than the first extent of vibration (e.g., EXTENT1) at the first area 108A.

Next, as shown in the example of FIG. 7B, at block 720 the droplet can be reduced by atomization from the second size to a third size using the second signal having the second frequency. As shown in the example of FIG. 1, fluid droplet 102 can be reduced by atomization from the second size 102B to a third size 102C using the second signal 118 having the second frequency 120.

Next, at decision block 722 it is determined whether to end the cycle of expelling fluid from the optical surface. For example, if a control input registered at a time determines that the cycle is not to end at that time, then flow execution transfers to block 702 shown in FIG. 7A. However, if a control input registered at that time determines that the cycle is to end at that time, then after block 722, the example method 700 can end.

FIG. 8 is a block diagram of an example processing platform capable of executing the machine readable instructions of FIGS. 8A-8B to implement the example system to expel fluid from the droplet under wettability control, according to an embodiment as shown in the example of FIG. 1.

The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of this example includes a processor 812. The processor 812 of this example is hardware. For example, the processor 812 can be implemented by one or more integrated circuits, logic circuits, microprocessors or controllers from any desired family or manufacturer. The hardware of processor 812 can be virtualized using virtualization such as Virtual Machines and/or containers. The processor 812 can implement example signal generator 112, including example first signal 114, example first frequency 116, example second signal 118, and example second frequency 120.

The processor 812 of this example includes a local memory 813 (e.g., a cache). The processor 812 of this example is in communication with a main memory including a volatile memory 814 and a nonvolatile memory 816 via a bus 818. The volatile memory 814 may be implemented by synchronous dynamic random access memory (SDRAM), dynamic random access memory (DRAM), RAMBUS dynamic random access memory (RDRAM) and/or any other type of random access memory device. The nonvolatile memory 816 may be implemented by flash memory and/or any other desired type of memory device. Access to the main memory 814, 816 is controlled by a memory controller.

The processor platform 800 of this example also includes an interface circuit 820. The interface circuit 820 may be implemented by any type of interface standard, such as an Ethernet interface, a universal serial bus (USB), and/or a PCI express interface.

In this example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of this example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of this example, thus, usually includes a graphics driver card, a graphics driver chip or a graphics driver processor.

The interface circuit 820 of this example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of this example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIG. 8 may be stored in the mass storage device 828, in the volatile memory 814, in the nonvolatile memory 816, and/or on a removable tangible computer readable storage medium such as a CD or DVD.

Modifications are possible in the described examples, and other implementations are possible, within the scope of the claims.

What is claimed is:

1. Apparatus to expel fluid from a droplet on a surface using a transducer mechanically coupled to the surface, the apparatus comprising:
a first area of the surface having a first wettability for the fluid; and
a second area of the surface having a second wettability for the fluid, in which the second wettability of the second area of the surface is greater than the first wettability of the first area of the surface, and the first area and the second area have a patterned arrangement;
wherein the transducer is configured to excite a vibrational mode of the surface having a greater extent of vibration at the second area than at the first area.

2. The apparatus of claim 1, wherein a first edge of the first area is proximate to a second edge of the second area in the patterned arrangement.

3. The apparatus of claim 1, wherein:
the first area is a plurality of first areas;
the second area is a plurality of second areas; and
the patterned arrangement of the first and second areas is an alternating arrangement in which a member of the first areas is interposed between a pair of members of the second areas.

4. The apparatus of claim 1, wherein:
the first area is a plurality of first areas;
the second area is a plurality of second areas; and
the patterned arrangement of the first and second areas is an alternating arrangement in which a member of the second areas is interposed between a pair of members of the first areas.

5. The apparatus of claim 1, wherein the second wettability of the second area of the surface is sufficiently greater than the first wettability of the first area of the surface to cause at least some movement of the droplet from the first area to the second area.

6. Apparatus to expel fluid from a droplet on a surface using a transducer mechanically coupled to the surface, the apparatus comprising:
a first area of the surface having a first wettability for the fluid; and
a second area of the surface having a second wettability for the fluid, in which the second wettability of the second area of the surface is greater than the first wettability of the first area of the surface, and the first area and the second area have a patterned arrangement;
wherein:
the first area is a plurality of first areas;
the second area is centrally arranged between a pair of members of the first areas; and
the first areas have respective increasing gradients of wettability in respective directions centrally oriented towards the second area.

7. The apparatus of claim 6, further comprising a signal generator configured to generate a first signal having a first frequency to reduce the droplet from a first size to a second size, and to generate a second signal having a second frequency to reduce the droplet from the second size to a third size.

8. The apparatus of claim 7, wherein the first area has a first width dimension that is greater than a corresponding width of the second size of the droplet.

9. The apparatus of claim 7, wherein the second area has a second width dimension that is greater than a corresponding width of the second size of the droplet.

10. The apparatus of claim 7, wherein the first area has a first width dimension that is greater than a corresponding width of the third size of the droplet.

11. The apparatus of claim 7, wherein the second area has a second width dimension that is greater than a corresponding width of the third size of the droplet.

12. The apparatus of claim 7, wherein the first frequency is higher than the second frequency.

13. The apparatus of claim 7, wherein the first frequency is within a first resonant frequency band of the transducer, and the second frequency is within a second resonant frequency band of the transducer.

14. Apparatus to expel fluid of a droplet from a surface using a transducer mechanically coupled to the surface, the apparatus comprising:
 first and second adjacent areas of the surface in which the droplet overlaps the first and second areas of the surface, and the first area has a first wettability that is greater than a second wettability of the second area; and
 a signal generator configured to generate a signal having a frequency to reduce a size of the droplet;
 wherein the frequency of the signal generator is to excite a vibrational mode of the surface having a greater extent of vibration at the second area than at the first area.

* * * * *